US012184831B2

(12) United States Patent
Muhassin et al.

(10) Patent No.: US 12,184,831 B2
(45) Date of Patent: Dec. 31, 2024

(54) METHODS AND APPARATUSES FOR TESTING IMAGING DEVICES

(71) Applicant: Motional AD LLC, Boston, MA (US)

(72) Inventors: Nijumudheen Muhassin, Jefferson Hills, PA (US); Jayesh Dwivedi, Oakmont, PA (US); Low Yew Kwang, Singapore (SG)

(73) Assignee: Motional AD LLC, Boston, MA (US)

( * ) Notice: Subject to any disclaimer, the term of this patent is extended or adjusted under 35 U.S.C. 154(b) by 390 days.

(21) Appl. No.: 17/523,401

(22) Filed: Nov. 10, 2021

(65) Prior Publication Data

US 2023/0146505 A1    May 11, 2023

(51) Int. Cl.
*H04N 17/00* (2006.01)
*G01M 11/08* (2006.01)
*G01S 7/497* (2006.01)
*G01S 17/931* (2020.01)
*G06T 7/80* (2017.01)

(52) U.S. Cl.
CPC ........ *H04N 17/002* (2013.01); *G01M 11/083* (2013.01); *G01S 7/497* (2013.01); *G01S 17/931* (2020.01); *G06T 7/80* (2017.01)

(58) Field of Classification Search
CPC .................................................. H04N 17/002
USPC ....................................................... 73/865.6
See application file for complete search history.

(56) References Cited

U.S. PATENT DOCUMENTS

| | | | |
|---|---|---|---|
| 2003/0098692 A1 | 5/2003 | Cotton et al. | |
| 2004/0070669 A1* | 4/2004 | Aoyama | H04N 17/02 348/188 |
| 2006/0028640 A1 | 2/2006 | Boehmisch et al. | |
| 2011/0249115 A1* | 10/2011 | Genest | G01N 25/72 348/E5.085 |
| 2016/0370423 A1 | 12/2016 | Gauss et al. | |
| 2017/0167967 A1* | 6/2017 | Bugher | G01N 17/002 |

(Continued)

FOREIGN PATENT DOCUMENTS

| | | |
|---|---|---|
| FR | 2974904 | 11/2012 |
| JP | H0312536 | 1/1991 |
| JP | 2005-069938 | 3/2005 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Walter L Lindsay, Jr.
*Assistant Examiner* — Philip T Fadul
(74) *Attorney, Agent, or Firm* — Fish & Richardson P.C.

(57) ABSTRACT

Provided are methods and apparatuses for testing imaging devices, which can include a testing apparatus a testing apparatus including a test chamber; a device receptacle inside the test chamber for holding a device under test; a target receptacle inside the test chamber for holding an optical target within a field of view of the device under test; a temperature controller configured to adjust a temperature proximate to the device receptacle; and an air curtain controller configured to generate an air curtain inside the test chamber between a location of the device receptacle and a location of the target receptacle, the air curtain thermally isolating the device receptacle from the target receptacle.

25 Claims, 10 Drawing Sheets

(56) References Cited

U.S. PATENT DOCUMENTS

2018/0231582 A1* 8/2018 Sakai ................ G01R 31/2867
2022/0128625 A1* 4/2022 Akers ................ G01R 31/2875

OTHER PUBLICATIONS

Iqsdirectory.com [online], "Temperature Chambers," available on or before Mar. 5, 2021, via Internet Archive: Wayback Machine URL <http://web.archive.org/web/20210305162907/https://www.iqsdirectory.com/articles/environmental-chamber/temperature-chamber.html>, retrieved on Aug. 2, 2022, URL <https://www.iqsdirectory.com/articles/environmental-chamber/temperature-chamber.html>, 25 pages.

Testequity.com [online], "What is GN2 Purge?" available on or before Apr. 22, 2021, via Internet Archive: Wayback Machine URL <http://web.archive.org/web/20210422233444/https://www.testequity.com/GN2-purge>, retrieved on Aug. 2, 2022, URL <https://www.testequity.com/GN2-purge>, 1 page.

\* cited by examiner

METHODS AND APPARATUSES FOR TESTING IMAGING DEVICES

BACKGROUND

Autonomous or semi-autonomous vehicles include various electronic component devices to facilitate operations of the vehicles, e.g., cameras or other light sensors to gather information about the surrounding environment, processors to process the sensor information to control steering or braking, or both, among others. For vehicle reliability over a wide range of conditions, the sensors are tested for performance in different sensing environments, such as at various temperatures.

DETAILED DESCRIPTION

Figure 1:
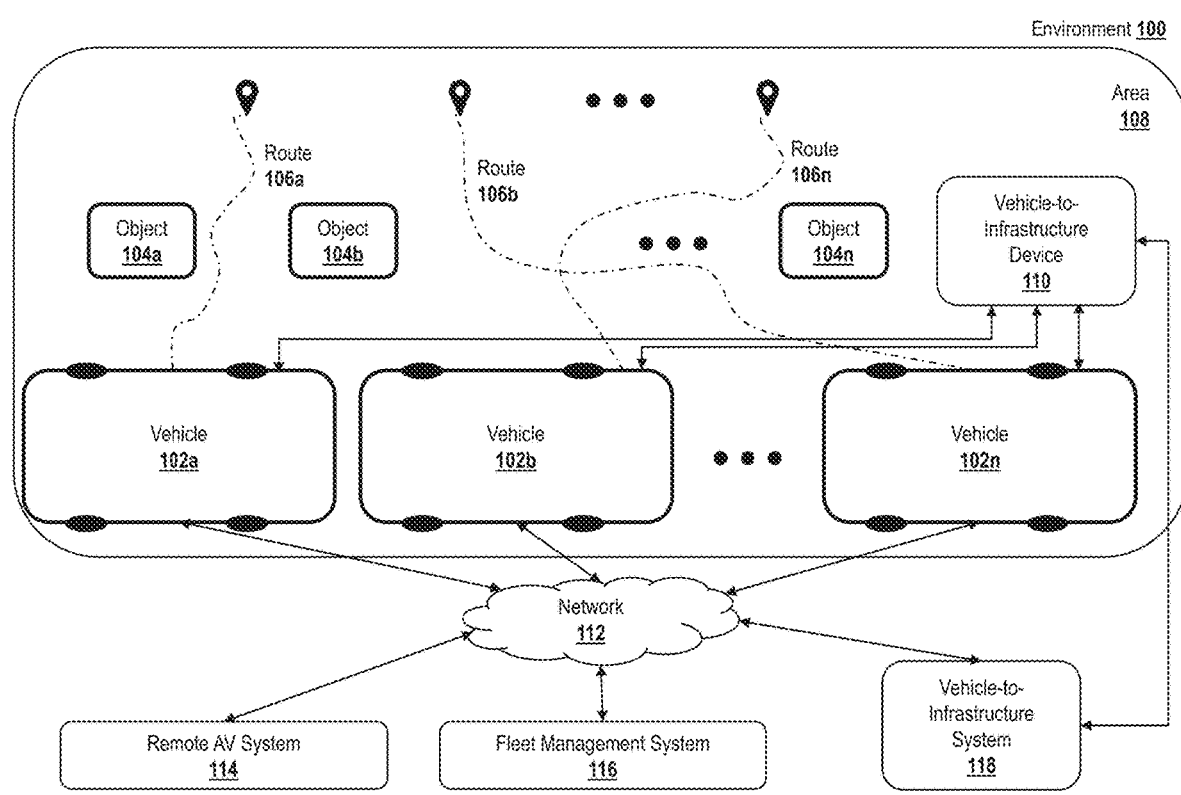
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the implementations described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all implementations or that the features represented by such element may not be included in or combined with other elements in some implementations unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first unit could be termed a second unit and, similarly, a second unit could be termed a first unit without departing from the scope of the described implementations. The first unit and the second unit are both units, but they are not the same unit.

The terminology used in the description of the various described implementations herein is included for the purpose of describing particular implementations only and is not intended to be limiting. As used in the description of the various described implementations and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some implementations, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations can be practiced without these specific details. In other instances, well-known methods, procedures, components, circuits, and networks have not been described in detail so as not to unnecessarily obscure aspects of the implementations.

General Overview of Vehicle Systems

In some aspects and/or implementations, systems and methods described herein include and/or implement environmental testing procedures for testing devices under test, such as cameras, other light sensors, and other devices. An apparatus includes a test chamber with an imaging device and an optical target, with the imaging device configured to detect light associated with the optical target, for example, light originating at and/or reflected by the optical target (e.g., to capture one or more images of the optical target). The imaging device is thermally isolated from the optical target so that temperatures of the imaging device can be varied without causing variations in the operational characteristics of the optical target due to temperature changes. The tested imaging devices can be included in various systems, including vehicles. For example, the tested imaging devices can be included in autonomous vehicles to assist in entity detection.

In the following sections, the disclosed systems and methods are described primarily with respect to imaging devices, such as cameras, LiDAR sensors, or other light sensors, being used as one or more devices under test in the test chamber. However, the disclosed systems and methods are applicable to test other types of sensors in the test chamber, including, for example, acoustic devices such as microphones 202d described above.

By virtue of the implementation of systems, methods, and computer program products described herein, various advantages can be realized. In some implementations, a device under test (e.g., a camera or other light sensor) and an optical target (or respective receptacles to hold these components) are both positioned within a test chamber. This can reduce or avoid complications associated with an intervening test chamber wall (such as condensation and temperature-dependent transmission effects) between the device under test and the optical target. In some implementations, thermal isolation is sustained between a device under test and an optical target (or respective receptacles to receive these components) using an air curtain, allowing a temperature of the device under test to be varied while a temperature of the optical target is approximately constant or separately controlled. This allows the optical target to have uniform characteristics for various temperature-dependent optical tests of the device under test. In doing so, measurements of the characteristics of the device under test are not impacted by temperature-induced variations of the optical target characteristics, which facilitates obtaining accurate and reliable measurements about the device under test over a wide temperature range. This can result in improved sensing performance when imaging devices that are tested/calibrated using these methods and apparatuses are deployed in systems such as autonomous vehicles, compared to methods and apparatuses in which optical targets are not thermally isolated from devices under test when performing temperature-based tests.

Referring now to FIG. 1, illustrated is an example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some implementations, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some implementations, vehicles 102 are configured to be in communication with V2I device 110, remote AV system 114, fleet management system 116, and/or V2I system 118 via network 112. In some implementations, vehicles 102 include cars, buses, trucks, trains, and/or the like. In some implementations, vehicles 102 are the same as, or similar to, vehicles 200, described herein (see FIG. 2). In some implementations, a vehicle 200 of a set of vehicles 200 is associated with an autonomous fleet manager. In some implementations, vehicles 102 travel along respective routes 106a-106n (referred to individually as route 106 and collectively as routes 106), as described herein. In some implementations, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some implementations, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some implementations, the first state includes a location at which an individual or individuals are to be picked-up by the AV and the second state or region includes a location or locations at which the individual or individuals picked-up by the AV are to be dropped-off. In some implementations, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some implementations, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some implementations, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some implementations, V2I device 110 is configured to be in communication with vehicles 102, remote AV system 114, fleet management system 116, and/or V2I system 118 via network 112. In some implementations, V2I device 110 includes a radio frequency identification (RFID) device, signage, cameras (e.g., two-dimensional (2D) and/or three-dimensional (3D) cameras), lane markers, streetlights, parking meters, etc. In some implementations, V2I device 110 is configured to communicate directly with vehicles 102. Additionally, or alternatively, in some implementations V2I device 110 is configured to communicate with vehicles 102, remote AV system 114, and/or fleet management system 116 via V2I system 118. In some implementations, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some implementations, remote AV system 114 is co-located with the fleet management system 116. In some implementations, remote AV system 114 is involved in the installation of some or all of the components of a vehicle, including an autonomous system, an autonomous vehicle computer, software implemented by an autonomous vehicle computer, and/or the like. In some implementations, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some implementations, fleet management system 116 is associated with a ridesharing company (e.g., an organization that controls operation of multiple vehicles (e.g., vehicles that include autonomous systems and/or vehicles that do not include autonomous systems) and/or the like).

In some implementations, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some implementations, V2I system 118 includes a server, a group of servers, and/or other like devices. In some implementations, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
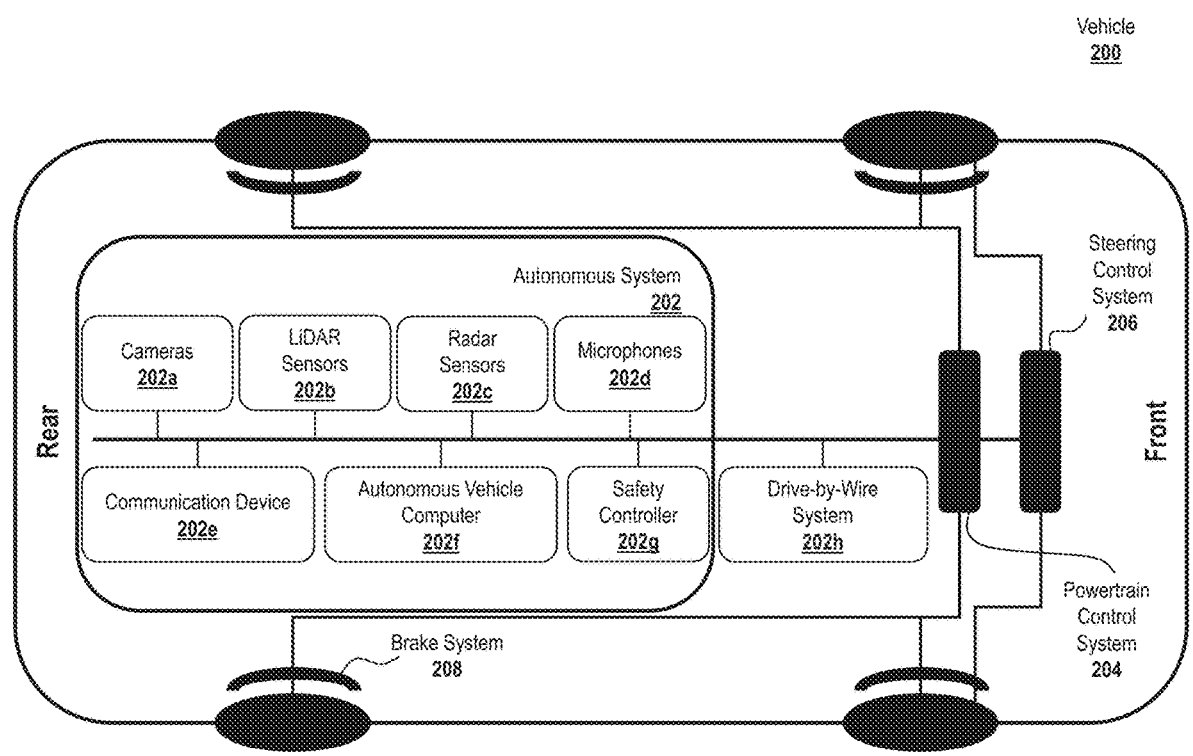
FIG. 2 is a diagram of one or more systems of a vehicle including an autonomous system.

Referring now to FIG. 2, illustrated is a diagram of one or more systems of a vehicle 200 including an autonomous system 202. The vehicle 200 includes autonomous system 202, powertrain control system 204, steering control system 206, and brake system 208. In some implementations, vehicle 200 is the same as or similar to vehicle 102 (see FIG. 1). In some implementations, vehicle 102 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some implementations, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some implementations, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some implementations, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some implementations, autonomous system 202 includes communication device 202e, autonomous vehicle computer 202f, and drive-by-wire (DBW) system 202h.

Figure 3:
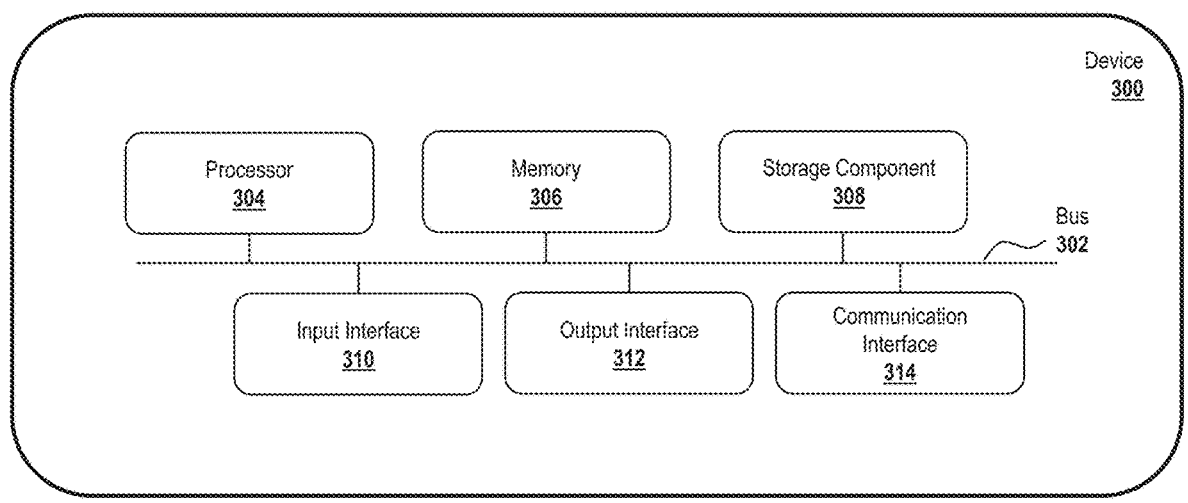
FIG. 3 is a diagram of components of one or more devices and/or one or more systems of FIGS. 1-2 and 4-9B.

Cameras 202a include at least one device configured to be in communication with communication device 202e, autonomous vehicle computer 202f, and/or safety controller 202g via a bus (e.g., a bus that is the same as or similar to bus 302 of FIG. 3). Cameras 202a include at least one imaging device or optical sensor, such as one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some implementations, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some implementations, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle computer 202f and/or a fleet management system (e.g., a fleet management system that is the same as or similar to fleet management system 116 of FIG. 1). In such an example, autonomous vehicle computer 202f determines depth to one or more objects in a field of view of at least two cameras of the plurality of cameras based on the image data from the at least two cameras. In some implementations, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an implementation, camera 202a includes at least one camera configured to capture one or more images associated with one or more traffic lights, street signs and/or other physical objects that provide visual navigation information. In some implementations, camera 202a generates traffic light data associated with one or more images. In some examples, camera 202a generates TLD data associated with one or more images that include a format (e.g., RAW, JPEG, PNG, and/or the like). In some implementations, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle computer 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b includes light (e.g., infrared light and/or the like) that is outside of the visible spectrum. In some implementations, during operation, light emitted by LiDAR sensors 202b encounters a physical object (e.g., a vehicle) and is reflected back to LiDAR sensors 202b. In some implementations, the light emitted by LiDAR sensors 202b does not penetrate the physical objects that the light encounters. LiDAR sensors 202b also include at least one light detector (e.g., at least one light sensor) which detects the light that was emitted from the light emitter after the light encounters a physical object. In some implementations, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle computer 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some implementations, during operation, radio waves transmitted by radar sensors 202c encounter a physical object and are reflected back to radar sensors 202c. In some implementations, the radio waves transmitted by radar sensors 202c are not reflected by some objects. In some implementations, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle computer 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some implementations, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle computer 202f, safety controller 202g, and/or DBW system 202h. For example, communication device 202e may include a device that is the same as or similar to communication interface 314 of FIG. 3. In some implementations, communication device 202e includes a vehicle-to-vehicle (V2V) communication device (e.g., a device that enables wireless communication of data between vehicles).

Autonomous vehicle computer 202f includes at least one device configured to be in communication with cameras 202a, LiDAR sensors 202b, radar sensors 202c, microphones 202d, communication device 202e, safety controller 202g, and/or DBW system 202h. In some examples, autonomous vehicle computer 202f includes a device such as a client device, a mobile device (e.g., a cellular telephone, a tablet, and/or the like), a server (e.g., a computing device including one or more central processing units, graphical processing units, and/or the like), and/or the like. In some implementations, autonomous vehicle computer 202f is the same as or similar to autonomous vehicle computer 400, described herein. Additionally, or alternatively, in some implementations autonomous vehicle computer 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some implementations, safety controller 202g is configured to generate control signals that take precedence over (e.g., override) control signals generated and/or transmitted by autonomous vehicle computer 202f.

DBW system 202h includes at least one device configured to be in communication with communication device 202e and/or autonomous vehicle computer 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some implementations, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some implementations, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some implementations, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a diagram of a device 300 that can correspond to components of one or more devices and/or one or more systems of FIGS. 1-2 and 4-9B. As illustrated, device 300 includes processor 304, memory 306, storage component 308, input interface 310, output interface 312, communication interface 314, and bus 302. In some implementations, device 300 corresponds to at least one device of vehicles 102 (e.g., at least one device of a system of vehicles 102), at least one device of remote AV system 114, at least one device of fleet management system 116, at least one device of vehicle-to-infrastructure system 118, a vehicle-to-infrastructure device 110, and/or one or more devices of network 112 (e.g., one or more devices of a system of network 112). In some implementations, device 300 corresponds to at least one device included in cameras 202a, LiDAR sensors 202b, radar sensors 202c, microphones 202d, communication device 202e, autonomous vehicle computer 202f, safety controller 202g, and/or another device of autonomous system 202. In some implementations, device 300 corresponds to at least one device included in brake system 208, powertrain control system 204, drive-by-wire system 202h, steering control system 206, and/or another device of vehicle 200. In some implementations, device 300 corresponds to at least one device included in control system 618, temperature controller 616, temperature control system 712, control system 824, temperature controller 812, and/or device under test 602, 702, 802, and/or 904.

Bus 302 includes a component that permits communication among the components of device 300. In some implementations, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some implementations input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some implementations, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some implementations, communication interface 314 permits device 300 to receive information from another device and/or provide information to another device. In some implementations, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some implementations, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some implementations, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, in some implementations hardwired circuitry is used in place of or in combination with software instructions to perform one or more processes described herein. Thus, implementations described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some implementations, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some implementations, a module is implemented in software, firmware, hardware, and/or the like.

The number and arrangement of components illustrated in FIG. 3 are provided as an example. In some implementations, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
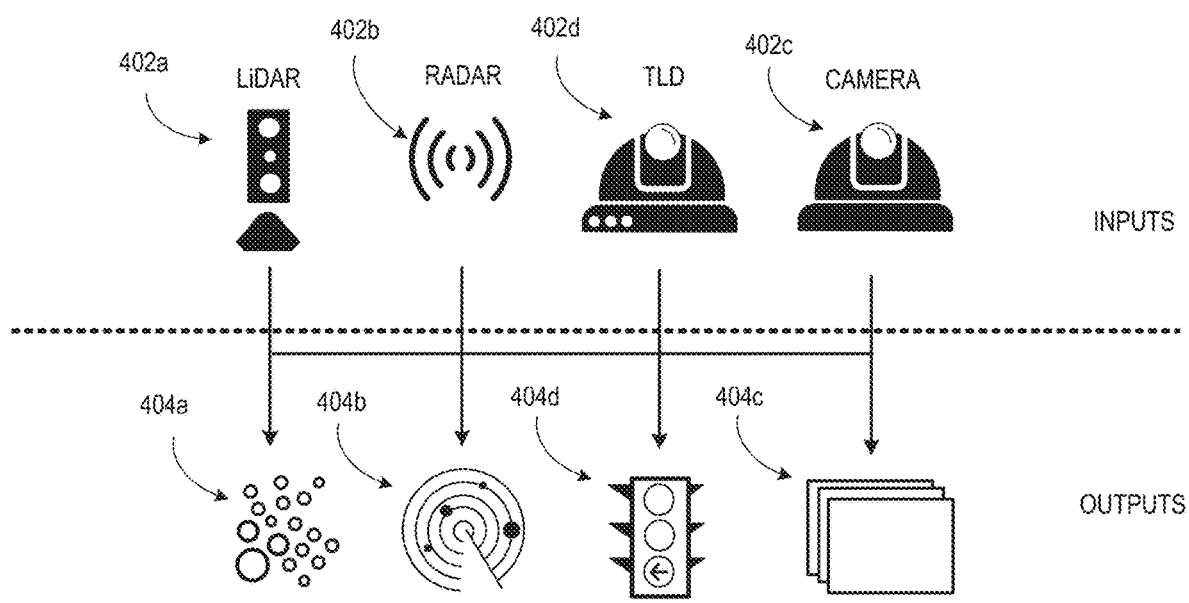
FIG. 4 is a diagram of example inputs and outputs that may be used by analysis and processing systems.

Referring now to FIG. 4, illustrated is an example of inputs 402a-d (e.g., sensors 202a-202c shown in FIG. 2) and outputs 404a-d (e.g., sensor data) that are used by analysis and processing systems, such as the autonomous vehicle computer 202f (FIG. 2), in some implementations. Analysis and processing systems need not have each of these inputs 402a-402d; rather, some implementations of analysis and processing systems have zero, one, two, or more of the inputs 402a-402d, in some implementations in addition to other input types.

One input 402a is a LiDAR system (e.g., LiDAR sensors 202b shown in FIG. 2). As described in reference to FIG. 2, LiDAR is a technology that uses light (e.g., bursts of light such as infrared light) to obtain data about physical objects in its line of sight. A LiDAR system produces LiDAR data as output 404a. For example, in some implementations LiDAR data includes collections of 3D or 2D points (also known as a point clouds) that are used to construct a representation of the environment 100.

Another input 402*b* is a radar system (e.g., radar sensors 202*c* shown in FIG. 2). As described in reference to FIG. 2, radar is a technology that uses radio waves to obtain data about nearby physical objects. Radars can obtain data about objects not within the line of sight of a LiDAR system. A radar system 402*b* produces radar data as output 404*b*. For example, in some implementations radar data includes one or more radio frequency electromagnetic signals that are used to construct a representation of the environment 100.

Another input 402*c* is a camera system (e.g., included in cameras 202*a* shown in FIG. 2). As described in reference to FIG. 2, a camera system uses one or more cameras (e.g., digital cameras using a light sensor such as a charge-coupled device [CCD]) to obtain information about nearby physical objects. A camera system produces camera data as output 404*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to an autonomous vehicle or other system in which the camera system is located. In use, the camera system may be configured to "see" objects far, e.g., up to a kilometer or more ahead of the autonomous vehicle or other system in which the camera system is located. Accordingly, the camera system may have features such as sensors and lenses that are optimized for perceiving objects that are far away.

Another input 402*d* is a traffic light detection (TLD) system. A TLD system uses one or more cameras to obtain information about traffic lights, street signs, and other physical objects that provide visual navigation information. A TLD system produces TLD data as output 404*d*. TLD data often takes the form of image data (e.g., data in an image data format such as RAW, JPEG, PNG, etc.). In some implementations, a TLD system differs from a generic system incorporating a camera in that a TLD system uses one or more cameras (e.g., cameras included in cameras 202*a* shown in FIG. 2) with a wide field of view (e.g., using a wide-angle lens or a fish-eye lens) in order to obtain information about as many physical objects providing visual navigation information as possible, so that the vehicle 200 has access to all relevant navigation information provided by these objects. For example, the viewing angle of a camera in the TLD system may be about 120 degrees or more.

In some implementations, outputs 404*a-d* are combined using a sensor fusion technique. Thus, either the individual outputs 404*a-d* are provided to other systems of the vehicle 200 (e.g., provided to an autonomous vehicle computer 202*f* as shown in FIG. 2), and/or the combined output can be provided to the other systems, either in the form of a single combined output or multiple combined outputs of the same type (e.g., using the same combination technique or combining the same outputs or both) or different types (e.g., using different respective combination techniques or combining different respective outputs or both). In some implementations, an early fusion technique is used. An early fusion technique is characterized by combining outputs before one or more data processing steps are applied to the combined output. In some implementations, a late fusion technique is used. A late fusion technique is characterized by combining outputs after one or more data processing steps are applied to the individual outputs.

Figure 5:
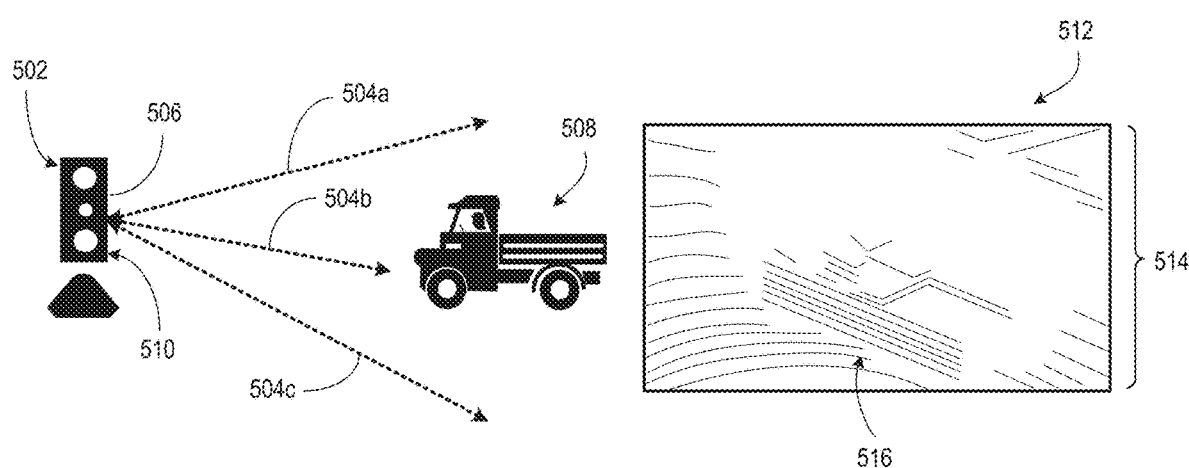
FIG. 5 is a diagram of an example LiDAR system.

Referring now to FIG. 5, illustrated is an example of a LiDAR system 502 (e.g., the input 402*a* shown in FIG. 4). The LiDAR system 502 emits light 504*a-c* from a light emitter 506 (e.g., a laser transmitter). Light emitted by a LiDAR system is typically not in the visible spectrum; for example, infrared light is often used. Some of the light 504*b* emitted encounters a physical object 508 (e.g., a vehicle) and reflects back to the LiDAR system 502. (Light emitted from a LiDAR system typically does not penetrate physical objects, e.g., physical objects in solid form.) The LiDAR system 502 also has one or more light detectors 510 (e.g., one or more light sensors), which detect the reflected light. In some implementations, one or more data processing systems associated with the LiDAR system generates an image 512 representing the field of view 514 of the LiDAR system. The image 512 includes information that represents the boundaries 516 of a physical object 508. In this way, the image 512 is used to determine the boundaries 516 of one or more physical objects near an AV.

In the interests of user safety and system effectiveness, sensor devices (e.g., one or more of cameras 202*a*, 402*c*, or 402*d*, LiDAR sensors 202*b*, or 404*a*, or other suitable imaging devices or other light sensors) should be reliable over a wide range of environmental conditions. For example, accurate sensor outputs (e.g., image data) should be provided over a wide temperature range, such as −40° C. to 85° C. or another temperature range. Accordingly, in some implementations sensor devices are tested for performance in these environmental conditions before being deployed to assist in operations of larger systems such as the vehicle 200 or the LiDAR system 502. For example, results of the testing can be used to calibrate the sensor devices and/or processing systems, such as the autonomous vehicle computer 202*f*, to improve accuracy of the sensor devices over the temperature range, for example, by applying offsets and/or coefficients to account for changing characteristic(s) of the sensor devices as a function of temperature. As described in greater detail below, in some implementations, the testing is performed in specially-configured test chambers that thermally isolate the sensor devices from optical targets.

Testing Apparatuses

Figure 6:
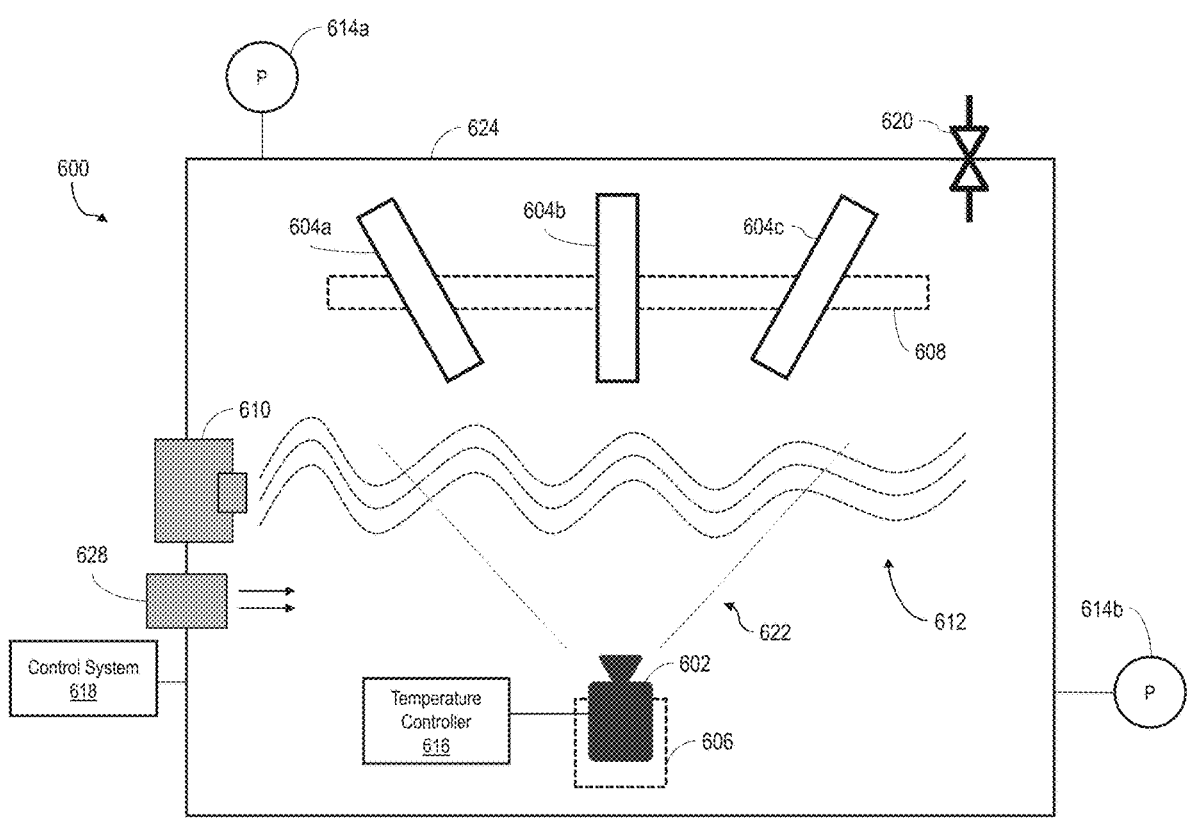
FIG. 6 is a diagram of an example testing apparatus.

Referring now to FIG. 6, illustrated is an example testing apparatus 600 that includes a test chamber 624. The test chamber 624 includes a device receptacle 606 and at least one target receptacle 608. The device receptacle 606 is configured to hold a sensor or imaging device being tested (also referred to as the "device under test") in a particular position in the test chamber. The target receptacle 608 is configured to hold an optical target in a different particular position in the test chamber. The illustrated example includes a device under test ("DUT") 602 mounted in the device receptacle 606 and optical targets 604*a*, 604*b*, 604*c* (referred to collectively as optical targets 604) mounted in the target receptacle 608. The test chamber 624 is sealed to maintain desired temperatures and gas compositions in the test chamber 624 compared to outside the test chamber 624.

The DUT 602 and the optical targets 604 are mounted such that the optical targets 604 are within a field of view 622 of the DUT 602. A position and/or orientation of the DUT 602 is determined at least in part by a configuration of the device receptacle 606, and positions and/or orientations of the optical targets 604 are determined at least in part by a configuration of the target receptacle 608. Accordingly, in some implementations the field of view 622 is determined at least in part by relative positions and respective configurations of the device receptacle 606 and the target receptacle 608.

One purpose of the testing apparatus 600 is to obtain images or other sensed representations of the optical targets 604 as captured by the DUT 602, while a temperature of the DUT 602 is varied. For example, as described in more detail below, the optical targets 604 can present a slant-edge pattern to the DUT 602, and images of the slant-edge pattern, which are captured by the DUT 602 as the temperature of the device under test 602 is varied, allow for determination of a modulation transfer function (MTF) of the DUT 602 as a function of temperature. In some cases, the MTF and/or other determined optical parameters guide incorporation of the tested devices into autonomous vehicles and related systems, such as vehicles 102, vehicle 200, and LiDAR system 502.

In some implementations, an air curtain controller 610 is configured to generate an air curtain 612 between a location of the device receptacle 606 and/or DUT 602 and locations of target receptacle 608 and/or the optical targets 604. The air curtain 612 is a controlled stream of gas that flows from the air curtain controller 610 across at least a portion of the test chamber 624. The dynamics of gas flow around the air curtain 612 thermally isolate the DUT 602 and/or the device receptacle 606 from the optical targets 604 and/or the target receptacle 608. When the testing apparatus 600 is in use with both the DUT 602 and the optical targets 604 inside the test chamber 624, and with the air curtain controller 610 generating the air curtain 612, environmental conditions of the DUT 602 can be varied without causing variations in the operational characteristics of the optical targets 604 due to temperature changes. This can be useful because the optical targets 604, in some implementations, do not have the same temperature resilience that the DUT 602 does, such that, for example, the optical targets 604 might be damaged or altered if exposed to the same environmental testing conditions as the DUT 602 (e.g., high or low temperatures). For example, a testing pattern presented by the optical targets 604 might have a different visual appearance at high or low temperatures than at moderate temperatures, and/or the optical targets 604 themselves might simply cease to function at high or low temperatures. By use of the air curtain 612, the DUT 602 is thermally isolated from the optical targets 604 so that the temperature of the DUT 602 can be varied while the temperature of the optical targets is maintained substantially constant and/or is controlled independently of the temperature of the DUT 602.

In some implementations, the gas emitted by the air curtain controller 610 is an inert gas (e.g., nitrogen). In some implementations, the gas emitted by the air curtain controller is low-humidity (e.g., with less than 1% water vapor, less than 0.1% water vapor, or less than 0.01% water vapor). An inert and/or low-humidity gas forming the air curtain 612 can reduce or prevent condensation and other undesirable effects on the DUT 602 and the optical targets 604.

As shown in FIG. 6, in some implementations the testing apparatus 600 is realized such that an optical path (e.g., a straight-line optical path 630) from the DUT 602 to the optical targets 604 is free of intervening components, such as walls or barriers, at least because both the DUT 602 and the optical targets 604 are inside the test chamber 624. This allows the DUT 602 to detect light associated with the optical targets 604 (e.g., for the DUT 602 to capture an image of the optical targets 604 using light originating at and/or reflected by the optical targets 604) with fewer or no temperature-dependent confounding factors. For example, if the DUT 602 was positioned inside the test chamber 624 while the optical targets 604 were positioned outside the test chamber 624, walls of the test chamber 624 might modify images of the optical targets 604 as the temperature of the DUT 602 were varied, e.g., because a refractive index of the walls might change as a function of temperature and/or because condensation might form on outer surfaces of the walls as the temperature of the DUT 602 is varied. In some implementations, positioning both the DUT 602 and the optical targets 604 inside the test chamber 624 avoids or reduces these complicating factors, and the simultaneous inclusion of the air curtain controller 610 allows for thermal isolation even with the DUT 602 and the optical targets 604 both inside the test chamber 624.

"Thermally isolated," as used in this disclosure, refers to two components (e.g., the device receptacle 606 and/or the DUT 602 vis-a-vis the target receptacle 608 and/or the optical targets 604) that are substantially thermally decoupled from one another, when the air curtain controller 610 is generating the air curtain 612 and configured to thermally isolate the two components. In some implementations, two components are thermally isolated when a first of the components can have its temperature varied over a given range without operational characteristics of the second component being modified, e.g., without optical or mechanical parameters of the second component being substantially modified. For example, in some implementations, the first component is a DUT or a holder of a DUT, and the first component can have its temperature varied over a range (e.g., −40° C. to 85° C.) without optical or mechanical parameters of the second component (an optical target or a holder of an optical target) being modified to an extent detectable using the DUT. In some implementations, the second component's temperature is maintained within 5° C. or within 10° C. of an intermediate value due to the air curtain 612 while the first component's temperature is varied over the range of −40° C. to 85° C. When a first component is thermally isolated from a second component, it can be described that a temperature of the first or the second component can be adjusted substantially independently of a temperature of the other component.

In some implementations, the DUT 602 includes at least one light sensor. A device including at least one light sensor can be referred to as an "imaging device." For example, the DUT 602 can include a camera or a LiDAR sensor, such as cameras 202a, 402c, 402d, and/or LiDAR sensors 202b, 402a. "Light sensor" includes at least any device that is sensitive to light and that produces and/or that is configurable to produce one or more outputs (e.g., signals such as currents and/or voltages) responsive to the light. In some implementations, the DUT 602 includes multiple individual light sensors (e.g., pixels), outputs of which are indicative of an image sensed by the DUT 602. In some implementations, the DUT 602 includes a small number of light sensors (e.g., one light sensor), such as in some (but not all) implementations of a LiDAR sensor as the DUT 602. Types of light sensed by the at least one light sensor can include, in various implementations, visible light, infrared light, ultraviolet light, and/or terahertz-frequency light. In some implementations, the DUT 602 includes a light source (e.g., the light emitter 506), such as an incandescent light bulb, a light-emitting diode, and/or a laser, which can emit light in any or all of the wavelength ranges noted for the at least one light sensor. For example, in cases where the DUT 602 includes a LiDAR sensor, a laser of the DUT 602 can illuminate the optical targets 604 for subsequent detection of reflected laser light by the LiDAR sensor. In some implementations, a wavelength detected by a light sensor of the DUT 602 is a wavelength detected by a light source of the DUT 602. In some implementations, the DUT 602 includes a computer device (e.g., device 300) configured to receive (e.g., from another computer system) a command to capture an image and/or detect light, and/or configured to transmit data representative of captured images and/or detected light to the other computer system.

The optical targets 604, in some implementations, include or present patterns that, when analyzed in images captured by the DUT 602, allow for the determination of optical parameters of the DUT 602 under a given set of environmental conditions. Various implementations of the optical targets 604 are within the scope of this disclosure. For example, optical parameters determinable based on images of the optical targets 604 can include focal length, field curvature, chromatic aberration of at least one type, astigmatism, depth of focus, rotational symmetry, relative illumination and/or sharpness, and the optical targets 604 can be configured differently (e.g., in number, appearance, and/or device type) based on the type of optical parameter(s) to be determined. For example, in some implementations, when determining MTF (which characterizes sharpness), the optical targets 604 include a spatial frequency response (SFR) target, such as a slanted edge pattern, a wedge pattern, and/or a Siemens star pattern.

The physical form of the optical targets 604 can also vary depending on the implementation. In some implementations, the optical targets 604 include at least one test pattern printed on paper or another physical medium, at least one test pattern on glass (e.g., as a chrome or other material pattern formed lithographically on the glass), at least one test pattern displayed on a display (e.g., on a computer monitor), and/or at least one test pattern projected from the optical targets 604 to the DUT 602. The optical targets 604 need not present/display an imaging pattern; for example, in some implementations, the optical targets 604 include a physical object having a known outer topology, e.g., for testing LiDAR sensors that measure boundaries of the physical object by detecting light reflected by the physical object. For projection, in some implementations the optical targets 604 include at least one collimator arranged to project a test pattern into an input pupil of the DUT 602. The collimators can be fixed-focus with preset infinity or finite object distances, and/or they can be motorized for variable object distances. In some implementations, multiple collimators are employed (e.g., optical targets 604a, 604b, 604c). For example, each collimator can be used to measure an MTF for a particular field point in a field of view of the DUT, e.g., at multiple spacings from a center of the field of view, such as 0.0F (center of the field of view), 0.5F (50% away from the center of the field of view), and 0.85F (85% away from the center of the field of view). MTF for each field point can have different temperature-dependencies that can be measured separately using separate respective optical targets. Although FIG. 6 shows three optical targets 604, a number of the optical targets 604 can, in various implementations, be one, two, or more than three.

In some implementations, as shown in FIG. 6, the DUT 602 is mounted in/on a device receptacle 606, and the optical targets 604 are mounted in/on at least one target receptacle 608. The receptacles 606, 608 can include optical mounts (e.g., fixed, kinematic, and/or gimbal mounts), screw-holes such as optical table-standard tapped holes (e.g., M6 and/or ¼-20" UNC holes), movable mounts able to translate and/or rotate (e.g., optical rails), or any other mechanical device or set of devices able to receive and hold the DUT 602 or optical targets 604 in position for imaging. In implementations that include multiple optical targets 604, a single target receptacle 608 can receive and hold multiple optical targets 604, and/or separate target receptacles 608 can hold individual optical targets 604. Moreover, some implementations do not include either or both of the device receptacle 606 and the at least one target receptacle 608. For example, the DUT 602 and/or the optical targets 604 can be placed on two respective sides of the air curtain 612 even in the absence of specific receptacle components.

To vary temperatures of the DUT 602, in some implementations the testing apparatus 600 includes a temperature controller 616. The temperature controller 616 is configured and arranged to adjust a temperature proximate to the device receptacle 606 so as to adjust the temperature of the DUT 602. In various implementations, the temperature proximate to the device receptacle 606 can be a temperature of the device receptacle 606 itself, a temperature of another component in thermal contact with the DUT 602 when the DUT 602 is positioned in the device receptacle 606, a temperature of the DUT 602 itself when the DUT 602 is positioned in the device receptacle 606, and/or an atmospheric temperature (e.g., ambient temperature) in the test chamber 624 that is representative of the temperature of the DUT 602, such as a temperature of a zone in which the DUT 602 is located.

Figure 7:
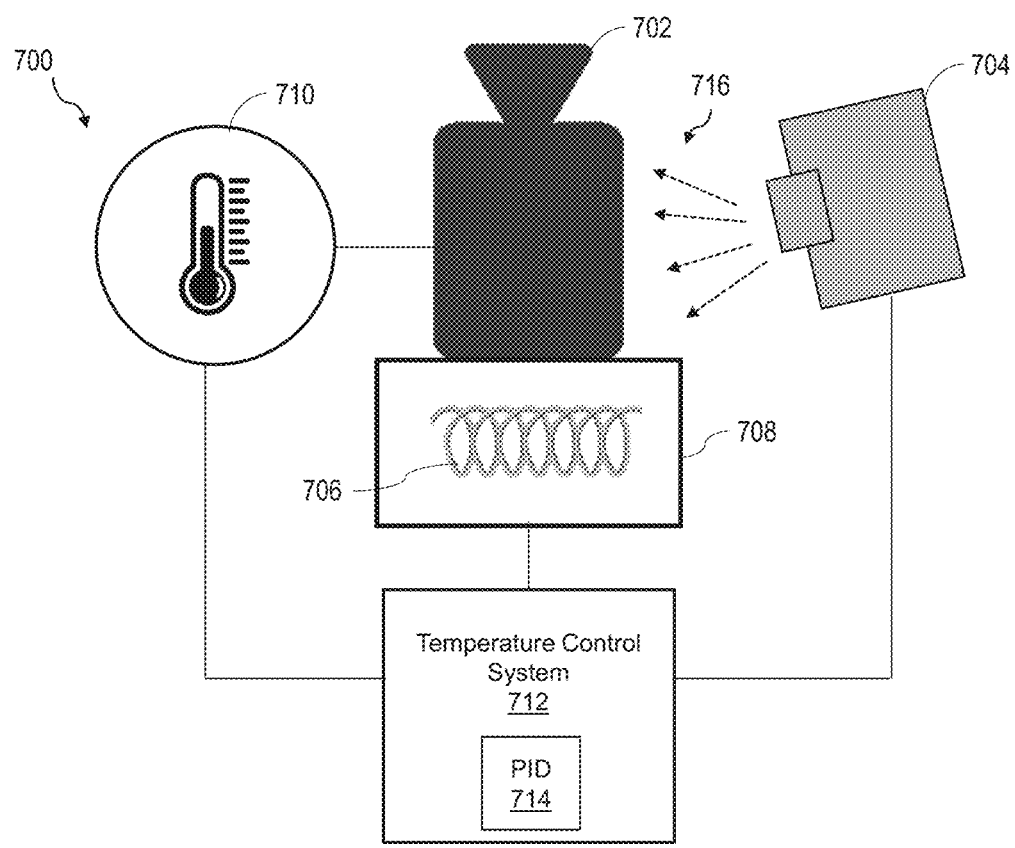
FIG. 7 is a diagram of an example temperature controller.

Referring now to FIG. 7, illustrated is a diagram of an example temperature controller 700 (e.g., the temperature controller 616) that includes at least one temperature adjustment device configured to apply heat and/or remove heat so as to adjust the temperature proximate to the device receptacle. In this example, a heating element 708 includes an inductive coil 706 through which current can be passed to heat a DUT 702 (e.g., DUT 602). A cooling element 704 includes a gas jet configured and arranged to spray the DUT 702 with a cold gas (e.g., a gas that is cooler than the DUT 702), so as to cool the DUT 702. In some implementations, the sprayed gas is an inert gas (e.g., nitrogen). In some implementations, the sprayed gas is low-humidity (e.g., with less than 1% water vapor, less than 0.1% water vapor, or less than 0.01% water vapor). An inert and/or low-humidity sprayed gas can reduce or prevent condensation and other undesirable effects on the DUT 702.

Implementations of the temperature controller 700 can instead or additionally include other types of temperature adjustment devices, such as resistive heaters, gas jets configured to spray the DUT 702 with hot gas (e.g., a gas that is warmer than the DUT 702), and/or Peltier devices in thermal contact with the DUT 702 and/or a device receptacle (not shown). A Peltier device can, in some implementations, both heat and cool the DUT 702 depending on a direction and magnitude of current/voltage applied to the Peltier device. In some implementations, the temperature controller 700 is configured to adjust the temperature proximate to the device receptacle within a range of −40° C. to 85° C., or another range.

A temperature control system 712 is in communication with (e.g., electronically coupled) at least one temperature sensor 710 arranged to measure the temperature proximate to the device receptacle, and to the at least one temperature adjustment device (in this example, the heating element 708 and the cooling element 704). The at least one temperature sensor 710 can include a thermocouple, a resistive sensor, a diode-based sensor, an optical sensor, and/or another type of temperature sensor.

The temperature control system 712 includes at least one computer device, e.g., device 300. In some implementations, the temperature control system 712 receives a stream of data indicative of the measured temperature proximate to the device receptacle from the temperature sensor 710 and adjusts operations of the heating element 708 and/or the cooling element 704 to cause the temperature proximate to the device receptacle to reach a target temperature. For example, if the measured temperature is different from the target temperature, the temperature control system 712 can increase or decrease a current flowing through the inductive coil 706, and/or increase or decrease a rate of gas sprayed by the gas jet of the cooling element 704, to cause a current temperature proximate to the device receptacle to match or become closer to (e.g., within a defined temperature difference from) the target temperature. In some implementations, the temperature control system 712 includes a PID module 714 configured to apply a proportional-integral-derivative-type algorithm to perform temperature control. In some implementations, at least one other algorithm is instead or additionally employed.

In some implementations, the temperature control system 712 includes at least some components configured to measure and/or adjust one or more temperatures besides the temperature proximate to the device receptacle. For example, in some implementations the temperature control system 712 includes a temperature sensor arranged to measure a temperature proximate to a target receptacle (e.g., a temperature of the target receptacle itself, a temperature of another component in thermal contact with an optical target when the optical target is positioned in the target receptacle, a temperature of the optical target itself when the optical target is positioned in the target receptacle, and/or an atmospheric temperature in the test chamber (e.g., ambient temperature) that is representative of the temperature of the optical target, such as a temperature of a zone in which the optical target is located). In some implementations, the temperature control system 712 includes at least one heating and/or cooling element (e.g., as described for heating element 708 and cooling element 704) arranged and configured to adjust the temperature proximate to the target receptacle, e.g., based on a target temperature proximate to the target receptacle set by the temperature control system 712. These capabilities can supplement the thermal isolation provided by the air curtain, such as by setting the target temperature proximate to the target receptacle to room temperature and using at least one heating and/or cooling element to adjust the temperature proximate to the target receptacle to room temperature.

Referring again to FIG. 6, in some implementations a control system 618 is in communication with (e.g., electrically coupled) at least one other component of the testing apparatus 600 and is configured to control operations of the testing apparatus 600. For example, in some implementations the control system 618 includes the temperature controller 616 or is in communication with the temperature controller 616. The control system 618 is configured to perform temperature regulation using the temperature controller 616, e.g., by providing a target temperature and commands to the temperature controller 616. The control system 618 includes at least one computer device, e.g., device 300. In various implementations, the control system 618 can be local to the test chamber 624 and outside the test chamber 624, within the test chamber 624, and/or remote from the test chamber 624, e.g., at least partially as a cloud-based or server-based control system.

In some implementations, the control system 618 is configured to cause test operations to be performed. For example, in some implementations the control system 618 is in communication with (e.g., electrically coupled to) the DUT 602, and the control system 618 is configured to send at least one signal to the DUT 602 to cause the DUT 602 to capture an image of the optical targets 604 and/or otherwise detect light originating at and/or reflected by the optical targets 604. For example, the control system 618 can be configured to send the at least one signal in response to a user input received at the control system 618, a signal received at the control system 618 from a remote source, and/or in response to determining, based on at least one temperature data stream from the temperature controller 616, that the temperature proximate to the device receptacle 606 is at or within a defined difference from a target temperature.

In some implementations, the control system 618 is configured to cause a multi-temperature testing routine. The control system 618 sets a target temperature in a sequence of multiple target temperatures, and the temperature controller 616 controls the temperature proximate to the device receptacle 606 to be at or within a predetermined difference from the target temperature. The control system 618 causes the air curtain controller 610 to create an air curtain 612, such that the DUT 602 is thermally isolated from the optical targets 604. In response to receiving temperature data from the temperature controller indicating that the temperature proximate to the device receptacle 606 is at or within the defined difference from the target temperature, the control system 618 causes the DUT 602 to capture at least one corresponding image of the optical targets 604. In some implementations, the control system 618 is configured to receive data representative of images captured by the DUT 602. This process can be repeated for subsequent target temperatures in the sequence of multiple target temperatures.

In some implementations, the testing apparatus 600 includes at least one component configured to control an atmosphere and pressure within the test chamber 624. In this example, the testing apparatus 600 includes two pressure sensors 614a, 614b, an outlet valve 620, and a gas inlet 628, the operations of which are described in further detail in reference to FIG. 8.

Figure 8:
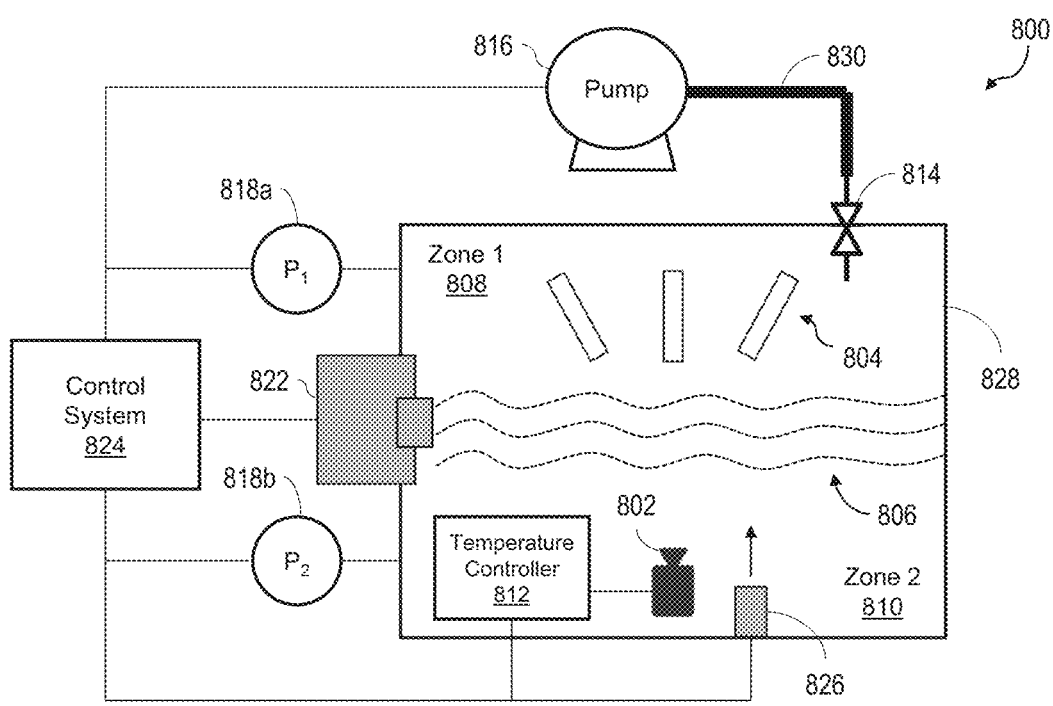
FIG. 8 is a diagram of an example testing apparatus including pressure regulation components.

Referring now to FIG. 8, illustrated is a diagram of an example testing apparatus 800 (e.g., the testing apparatus 600, with, in some implementations, at least one component elided for clarity) that includes pressure regulation components. The testing apparatus 800 includes a control system 824 (e.g., control system 618, including a computer device such as device 300), a DUT 802 (e.g., DUT 602), at least one optical target 804 (e.g., optical targets 604), an air curtain controller 822 configured to generate an air curtain 806 (e.g., air curtain 612), a temperature controller 812 (e.g., temperature controller 616), a test chamber 828 (e.g., test chamber 624), two pressure sensors 818a, 818b (e.g., pressure sensors 614a, 614b), an outlet valve 814 (e.g., outlet valve 620) in fluidic communication with a pump 816, and a gas inlet 826 (e.g., gas inlet 628).

Although the DUT 802 and the optical target 804 are both within the test chamber 828, the air curtain 806, in some implementations, provides a strong enough gaseous barrier to sustain a steady-state pressure difference between a first zone 808 on a first side of the air curtain 806 (including the optical target 804) and a second zone 810 on a second side of the air curtain 806 (including the DUT 802). A first pressure sensor 818a is configured and arranged to sense a first pressure of the first zone 808, while a second pressure sensor 818b is configured and arranged to sense a second pressure of the second zone 810. The first zone 808 and the second zone 810 are separated by the air curtain 806. Although this example includes the two pressure sensors 818a, 818b, in some implementations no pressure sensors, one pressure sensor, or more than two pressure sensors are included.

The control system 824 is configured to perform operations and control other components of the testing apparatus 800 based on pressures sensed by the pressure sensors 818a, 818b and/or based on temperatures sensed by a temperature sensor (e.g., temperature sensor 710) of the temperature controller 812. In general, these operations fulfill at least one of two purposes. First, thermal isolation is maintained between the first zone 808 and the second zone 810 (e.g., between the DUT 802 and the optical target 804), which depends on a configuration of the air curtain controller 822, e.g., that the air curtain 806 includes a sufficiently high flow of gas. Second, one or more pressures within the test chamber 828 are maintained at or within certain levels, in absolute terms and/or relatively, e.g., so as not to exceed a limit beyond which operations of the air curtain 806 will be disrupted. In some implementations, these operations and controls are performed by a pressure control system (not shown), which can be a module of the control system 824 and/or a distinct system in communication with the control system 824.

Controlling at least one of the outlet valve 814, the gas inlet 826, or the pump 816 allows the control system 824 to set pressures within the test chamber 828, e.g., either or both of pressures of the first zone 808 and the second zone 810. The gas inlet 826 provides gas into the test chamber 828 separately from the air curtain controller 822 and temperature-regulating air jets (if present). As described for the air curtain controller and air jets, in some implementations the gas provided by the gas inlet 826 is inert and/or low-humidity. In some implementations, the gas inlet 826 is controllable in a binary manner, e.g., to either provide or not provide gas at any given time. In some implementations, the gas inlet 826 is controllable in an adjustable manner to set one of multiple non-zero flow rates of gas into the test chamber 828. Note that although FIG. 8 shows one gas inlet 826 that provides gas into the second zone 810, in some implementations a gas inlet additionally or instead provides gas into the first zone 808. Some implementations include multiple gas inlets and some implementations do not include a gas inlet, e.g., gas is provided into the test chamber 828 primarily in the form of the air curtain 806.

The outlet valve 814 (e.g., a one-way valve) provides a path through which gas in the test chamber 828 flows out of the test chamber 828. Because gas will generally be provided constantly into the testing apparatus 800 by the air curtain controller 822 when the testing apparatus 800 is in operation, in some implementations maintenance of steady-state pressure(s) in the test chamber necessitates corresponding ongoing removal of gas, such as through the outlet valve 814. In some implementations, the outlet valve 814 is controllable in a binary manner, e.g., to either release or not release gas at any given time. In some implementations, the outlet valve 814 is controllable in an adjustable manner to set one of multiple non-zero flow rates of gas out of the test chamber 828. In some implementations, the outlet valve 814 is in fluidic communication with (e.g., through pipes 830) a pump 816. The pump 816, when present, can be controllable in either or both of a binary manner or an adjustable manner (e.g., an adjustable pumping strength and/or speed). Control of either or both of the outlet valve 814 or the pump 816 allows the control system 824 to control a rate of gas removal from the test chamber 828. Note that although FIG. 8 shows one outlet valve 814 in the first zone 808, in some implementations an outlet valve is instead or additionally in the second zone 810, and some implementations include multiple outlet valves.

In some implementations, the control system 824 is in communication with the temperature controller 812, for example, configured to receive a stream of temperature data indicative of at least one temperature from at least one temperature sensor (e.g., temperature sensor 710) of the temperature controller 812. In some implementations, the at least one temperature includes a temperature proximate to a device receptacle and/or a temperature proximate to a target receptacle. These and other temperatures can be used as bases for pressure and atmospheric control operations.

In some implementations, pressure and atmospheric control operations of the control system 824 include at least one of the following example operations. In some implementations, the control system 824 is configured to adjust at least one of a pressure of the first zone 808 or a pressure of the second zone 810 such that a difference between the pressure of the first zone 808 and the pressure of the second zone 810 is within a defined limit. For example, the defined limit can be a limit beyond which gas flow of the air curtain 806 would be disrupted, such as 10 Pa, 20 Pa, 30 Pa, 50 Pa, or another defined limit. In some implementations, the defined limit is at least partially based on a current configuration of the air curtain controller 822, e.g., a current rate of gas provided to form the air curtain 806 and/or a current velocity of the gas forming the air curtain 806. The current configuration of the air curtain controller 822 can be obtained by the control system 824 from the air curtain controller.

The pressure difference can be adjusted by at least one of adjusting a rate of gas flow through the gas inlet 826, adjusting a rate of gas flow through the outlet valve 814, and/or adjusting a rate of gas removed by the pump 816. For example, if the pressure difference is determined to be too high (e.g., because an air jet of the temperature controller is elevating the pressure of the second zone 810 compared to the pressure of the first zone 808), the control system 824 can reduce a rate of gas input by the gas inlet 826 and/or reduce a rate of gas leaving through the outlet valve 814.

In some implementations, the control system 824 is configured to adjust at least one of a pressure of the first zone 808 or a pressure of the second zone 810 such that the pressure of the first zone 808 and/or the pressure of the second zone 810 is within a defined limit with respect to an ambient pressure outside the test chamber 828. In various implementations, the defined limit can be 1500 Pa, 1000, Pa, 500 Pa, or another value, and the defined limit can include either or both of an upper limit (for a pressurized test chamber 828) or a lower limit (for a test chamber 828 at a partial vacuum with respect to ambient). The pressure difference can be adjusted by at least one of adjusting a rate of gas flow through the gas inlet 826, adjusting a rate of gas flow through the outlet valve 814, and/or adjusting a rate of gas removed by the pump 816.

In some implementations, the control system 824 is configured to control a configuration of the air curtain controller 822 based on temperature data. The temperature data can include at least one of (i) a target temperature for the temperature controller 812 to set, or (ii) at least one temperature measured by the temperature controller 812. In some implementations, the target temperature corresponds to a configuration of the air curtain controller 822 that will provide thermal isolation when the temperature proximate to the device receptacle is at the target temperature, e.g., a rate of gas provided to form the air curtain 806 and/or a velocity of the gas forming the air curtain 806. In some implementations, the air curtain controller 822 is configured to access a stored relationship between target temperatures and configurations of the air curtain controller 822, and to configure the air curtain controller 822 to have a configuration matching a current target temperature. For example, larger deviations of the target temperature from room temperature can correspond to more gas flow and/or faster gas flow to form the air curtain 806. In some implementations, the same or similar control operations are instead or additionally performed based on at least one temperature measured by the temperature controller 812, e.g., a temperature proximate to a device receptacle and/or a temperature proximate to a target receptacle. For example, the at least one temperature can correspond to a configuration of the air curtain controller 822 that will provide thermal isolation given the at least one temperature. In some implementations, the air curtain controller 822 is configured to access a stored relationship between the at least one temperature measured by the temperature controller 812 and configurations of the air curtain controller 822, and configure the air curtain controller 822 to have a configuration matching the at least one temperature.

Figure 9A:
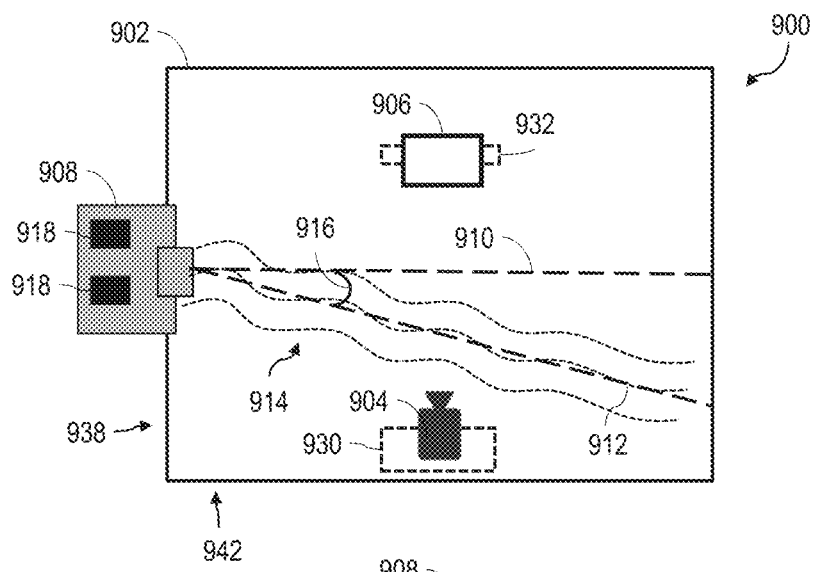
FIGS. 9A-9B are respectively top-view and side-view diagrams of a testing apparatus.
Figure 9B:
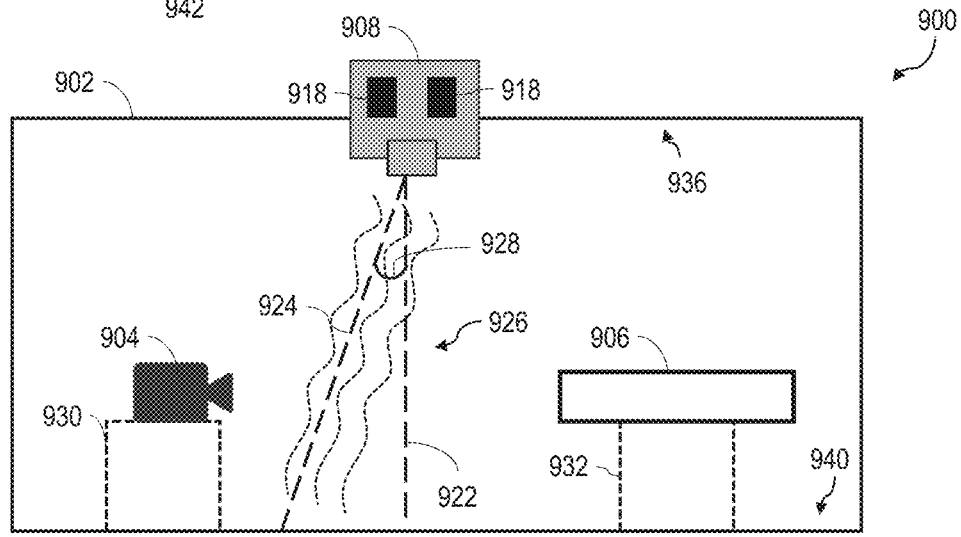

Referring now to FIGS. 9A-9B, illustrated are top-view and side-view diagrams, respectively, of a testing apparatus 900 in two respective configurations, the two configurations corresponding to two angles of emission of an air curtain. The testing apparatus 900 includes a DUT 904 (e.g., DUT 602) mounted on a device receptacle 930 (e.g., device receptacle 606); an optical target 906 (e.g., optical target 604) mounted on a target receptacle 932 (e.g., target receptacle 608); a test chamber 902 (e.g., test chamber 624) enclosing the device receptacle 930 and target receptacle 932, among other components; and an air curtain controller 908 configured to generate air curtain 914 in FIG. 9A and air curtain 926 in FIG. 9B.

In some implementations, the air curtain controller 908, and/or other air curtain controllers described in this disclosure, includes at least one component 918 that moves and/or treats gas to form the air curtains 914, 926. In some implementations, the at least one component 918 includes a fan, pump, and/or other type of gas mover that emits gas into the test chamber 902 to form the air curtains 914, 926. In some implementations, the at least one component 918 includes a plenum that distributes the emitted gas evenly across a width of the air curtains 914, 926. In some implementations, the at least one component 918 includes a dehumidifier to reduce the humidity of the emitted gas. In some implementations, the at least one component 918 includes a computer device (e.g., device 300) configured to control generation of the air curtains 914, 926, e.g., in response to commands sent by a control unit. In some implementations, the computer device of the air curtain controller is wholly or partially included (e.g., as a module) in a broader control system of the testing apparatus 900, such as control system 618 or control system 824. In some implementations, the at least one component 918 includes at least one temperature adjustment device to control a temperature of the emitted gas, e.g., to maintain the temperature of the emitted gas within a defined range, such as within a determined temperature difference from room temperature. In some implementations, the at least one component 918 includes a filter configured to remove dirt, dust, and other possible contaminants from the emitted gas. These components 918, and other components, can be present in any combination, in various implementations. In some implementations, the emitted gas is provided into the air curtain controller 908 from an external source (e.g., a gas tank). In some implementations, the emitted gas is at least partially drawn from within the test chamber 902 itself, e.g., as recirculated air.

The physical arrangement of the air curtain controller 908, and accordingly the direction of flow of the air curtains 914 or 926, can vary depending on the implementation. In some implementations, for effective thermal isolation, the stream of gas forming the air curtain is directed in a substantially transverse direction between the device receptacle 930 and/or the DUT 904 and the target receptacle 932 and/or the optical target 906. "Substantially transverse," as used in this disclosure, refers to angles, in various implementations, within 45°, within 30°, within 20°, or within 10° of a line perpendicularly bisecting a line segment between the two components. In the example of FIG. 9A, the air curtain controller 908 is positioned at a sidewall 938 of the test chamber 902, and the air curtain 914 is a stream of gas directed in the direction 912 which is at a substantially transverse lateral angle 916 with respect to a lateral line 910 perpendicularly bisecting a vertical line segment (not shown) between the device receptacle 930 and/or the DUT 904 and the target receptacle 932 and/or the optical target 906. In the example of FIG. 9B, the air curtain controller 908 is positioned at a ceiling 936 of the test chamber 902, and the air curtain 926 is a stream of gas directed in the direction 924 which is at a substantially transverse vertical angle 928 with respect to a vertical line 922 bisecting a lateral line segment (not shown) between the device receptacle 930 and/or the DUT 904 and the target receptacle 932 and/or the optical target 906 "Lateral" here refers to a direction parallel to a ground surface (e.g., ground surface 940 in FIG. 9B), and "vertical" here refers to a direction parallel to a sidewall surface perpendicular to the ground surface (e.g., sidewall surface 942 in FIG. 9A). In some implementations, the angle is tilted towards the device receptacle 930 and/or the DUT 904 and away from the target receptacle 932 and/or the optical target 906.

Example Processes For Test Image Capture

Figure 10:
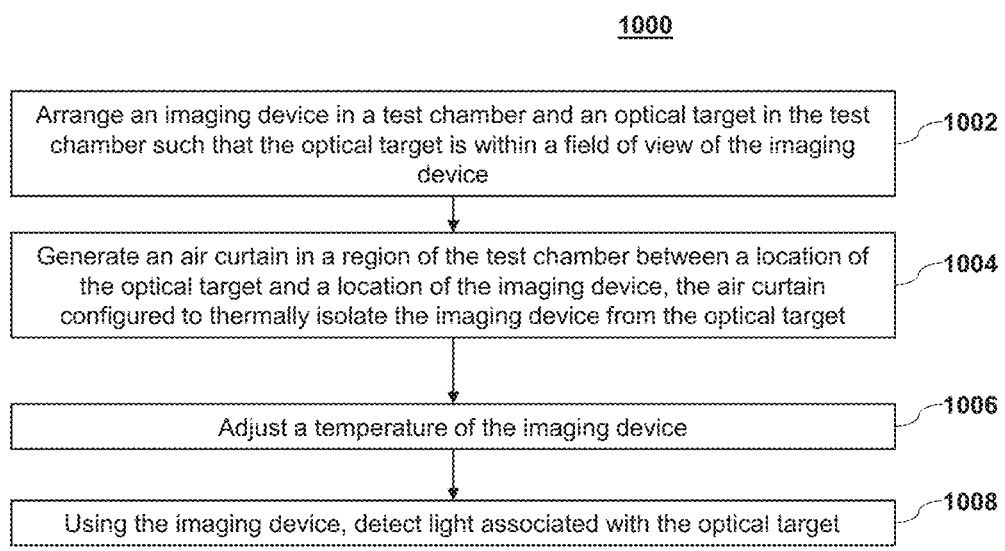
FIG. 10 is a flowchart of a process for testing imaging devices.

Referring now to FIG. 10, illustrated is a flowchart of a process 1000 for testing imaging devices, and specifically an example process 1000 for detecting light associated with an optical target using a DUT. In some implementations, the process 1000 is performed at least in part by the control system 618 that is coupled to various components of the testing apparatus 600. However, as described above, in some implementations the testing apparatus 600 is the same as, includes, or is in communication with (e.g., controllable communication with) other systems including, in some implementations, the temperature control systems 712, 812 and/or control system 824. Accordingly, in describing the process 1000, references are made to components shown in FIGS. 6-9B where applicable. References to specific example components in describing process 1000 does not mean that other components could not perform the same or similar functions, in keeping with the above disclosure. Moreover, in some implementations at least some of the process 1000 (e.g., arrangement of components) is performed by a user and/or a manipulating tool.

The process 1000 starts with arranging of an imaging device in a test chamber and an optical target in the test chamber, such that the optical target is within a field of view of the imaging device (1002). For example, the imaging device (the DUT 602) is positioned in the device receptacle 606, and the DUT 602 is positioned in the target receptacle 608, e.g., by a user or by at least one movable component (e.g., a gimbal) of the device receptacle 606 and/or target receptacle 608. For example, the field of view (e.g., field of view 622) can be a field of view that can be captured by the imaging device as an image and/or a field of view within which the imaging device can detect light.

The process 1000 continues with the generation of an air curtain in a region of the test chamber between a location of the optical target a and a location of the imaging device, the air curtain configured to thermally isolate the imaging device from the optical target (1004). For example, the air curtain is generated by the air curtain controller 822 or 908. For example, a configuration of the air curtain (e.g., a flow rate or flow speed) is set by a control system that includes at least part of and/or is in communication with the air curtain controller, such as control system 618 or control system 824. For example, the control system transmits an instruction to the air curtain controller to cause the air curtain controller to generate the air curtain.

A temperature of the imaging device is adjusted (1006). For example, temperature control system 712 receives a target temperature from control system 618 and uses one or both of cooling element 704 or heating element 708 to cause a temperature of the imaging device (as sensed using temperature sensor 710) to approach the target temperature.

Light associated with the optical target is detected using the imaging device (1008). For example, control system 618 receives, from the temperature controller 616, an indication that the temperature of the imaging device is at or within a defined distance from the target temperature, and, in response, the control system 618 provides an instruction to the imaging device to cause the imaging device to capture an image of the optical target.

In some cases, the air curtain controller 822 generates the air curtain by directing a stream of gas in a substantially transverse direction between the imaging device and the optical target. For example, the substantially transverse direction has an a laterally- and/or vertically-defined angle as described in reference to FIGS. 9A-9B.

In some cases, cooling element 704 sprays the imaging device with gas to cool the imaging device. In some cases, heating element 708 heats the imaging device with an inductive coil in thermal contact with the imaging device.

In some cases, a collimator within the test chamber projects the optical target to the imaging device. For example, the collimator can project a slanted edge pattern, a wedge pattern, and/or a Siemens star pattern.

In some cases, at least one of (i) a first pressure of a first chamber zone that includes the location of the imaging device, or (ii) a second pressure of a second chamber zone that includes the location of the optical target, is regulated such that a difference between the first pressure and the second pressure is within a defined limit. For example, the control system 824 receives respective streams of data from either or both of pressure sensors 818a, 818b, and reconfigures at least one of the gas inlet 826, the outlet valve 814, or the pump 816 to cause the difference between pressures to be within the defined limit.

In some cases, the device under test includes a light sensor. For example, the device under test includes a camera such as cameras 202a, 402c, or 402d, or a LiDAR sensor such as LiDAR sensor 202b or 402a. For example, the camera captures an image of the optical target by detecting light originating at and/or reflected by the optical target. For example, light is emitted towards the optical target, and the LiDAR sensor detects the light reflected by the optical target.

In the foregoing description, aspects and implementations of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms included in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. An apparatus comprising:
   a test chamber;
   a device receptacle inside the test chamber for holding a device under test;
   a target receptacle inside the test chamber for holding an optical target within a field of view of the device under test, wherein an optical path from the device under test positioned in the device receptacle to the optical target positioned in the target receptacle is free of intervening components;
   a temperature controller configured to adjust a temperature proximate to the device receptacle; and
   an air curtain controller configured to generate an air curtain inside the test chamber between a location of the device receptacle and a location of the target receptacle, the air curtain thermally isolating the device receptacle from the target receptacle.

2. The apparatus of claim 1, wherein the device under test comprises a light sensor.

3. The apparatus of claim 2, wherein the device under test comprises a camera or a LiDAR sensor.

4. The apparatus of claim 1, wherein the air curtain controller comprises a gas emission system arranged to direct a stream of gas in a substantially transverse direction between the device receptacle and the target receptacle.

5. The apparatus of claim 4, wherein the gas comprises nitrogen.

6. The apparatus of claim 1, wherein the temperature controller comprises a gas jet arranged to spray the device under test positioned in the device receptacle with gas.

7. The apparatus of claim 1, wherein the temperature controller comprises an inductive coil arranged to be in thermal contact with the device under test positioned in the device receptacle.

8. The apparatus of claim 1, wherein the optical target comprises at least one projecting collimator inside the test chamber.

9. The apparatus of claim 1, comprising a gas outlet coupled between an interior of the test chamber and an exterior.

10. The apparatus of claim 1, comprising a control system coupled to the temperature controller, the control system configured to perform operations comprising:
    obtaining a measured temperature proximate to the device receptacle;
    determining a target temperature of the device under test; and
    conditioned on the measured temperature being different from the target temperature, reconfiguring the temperature controller to cause a current temperature proximate to the device receptacle to match the target temperature.

11. The apparatus of claim 1, comprising a control system, the control system configured to regulate at least one of
    a first pressure of a first chamber zone that includes the location of the device receptacle, or a second pressure of a second chamber zone that includes the location of the target receptacle, such that a difference between the first pressure and the second pressure is within a defined limit.

12. The apparatus of claim 11, wherein the control system is configured to regulate the at least one of the first pressure or the second pressure by adjusting a gas removal rate of the test chamber.

13. The apparatus of claim 1, wherein the air curtain controller comprises a control system configured to perform operations comprising:
   obtaining a measured temperature proximate to the device receptacle; and
   adjusting a rate of gas emission by the air curtain controller based on the measured temperature.

14. The apparatus of claim 1, comprising a second temperature controller configured to adjust a temperature proximate to the target receptacle substantially independent of the temperature proximate to the device receptacle.

15. A method comprising:
   arranging an imaging device in a test chamber and an optical target in the test chamber such that the optical target is within a field of view of the imaging device, wherein an optical path from the imaging device to the optical target is free of intervening components;
   generating an air curtain in a region of the test chamber between a location of the optical target and a location of the imaging device, the air curtain configured to thermally isolate the imaging device from the optical target;
   adjusting a temperature of the imaging device; and
   using the imaging device, detecting light associated with the optical target.

16. The method of claim 15, wherein generating the air curtain comprises directing a stream of gas in a substantially transverse direction between the imaging device and the optical target.

17. The method of claim 15, wherein adjusting the temperature of the imaging device comprises at least one of
   cooling the imaging device by spraying the imaging device with gas, or
   heating the imaging device by heating an inductive coil in thermal contact with the imaging device.

18. The method of claim 15, comprising projecting the optical target to the imaging device using at least one collimator positioned within the test chamber.

19. The method of claim 15, comprising regulating at least one of
   a first pressure of a first chamber zone that includes the location of the imaging device, or a second pressure of a second chamber zone that includes the location of the optical target,
   such that a difference between the first pressure and the second pressure is within a defined limit.

20. The method of claim 15, wherein the device under test comprises a light sensor.

21. The method of claim 20, wherein the device under test comprises a camera or a LiDAR sensor.

22. The method of claim 15, wherein the optical target comprises at least one projecting collimator inside the test chamber.

23. The method of claim 15, wherein detecting the light associated with the optical target comprises detecting light originating at the optical target.

24. The method of claim 15, wherein detecting the light comprises:
   emitting the light towards the optical target; and
   detecting the light reflected by the optical target.

25. A test chamber control system comprising:
   at least one processor; and
   at least one computer-readable medium storing computer-executable instructions, that, when executed by the at least one processor, cause the at least one processor to perform operations comprising:
   causing an air curtain controller to generate an air curtain between an imaging device positioned in a test chamber and an optical target positioned in the test chamber, the air curtain configured to thermally isolate the imaging device from the optical target, wherein an optical path from the imaging device to the optical target is free of intervening components;
   causing a temperature controller to adjust a temperature of the imaging device; and
   causing the imaging device to detect light associated with the optical target.

* * * * *